United States Patent
Inada

(10) Patent No.: US 8,218,832 B2
(45) Date of Patent: Jul. 10, 2012

(54) APPARATUS FOR DETECTING FEATURE OF DRIVER'S FACE

(75) Inventor: Junya Inada, Nishikamo-gun (JP)

(73) Assignee: DENSO CORPORATION, Kariya (JP)

( * ) Notice: Subject to any disclaimer, the term of this patent is extended or adjusted under 35 U.S.C. 154(b) by 869 days.

(21) Appl. No.: 12/292,455

(22) Filed: Nov. 20, 2008

(65) Prior Publication Data

US 2009/0147080 A1 Jun. 11, 2009

(30) Foreign Application Priority Data

Dec. 7, 2007 (JP) ................................. 2007-317108

(51) Int. Cl.
*G08B 23/00* (2006.01)
*G06K 9/00* (2006.01)

(52) U.S. Cl. ...................... 382/118; 382/181; 340/573.1

(58) Field of Classification Search .................. 382/115, 382/118, 104, 181; 340/426, 425.5, 573, 340/434, 479
See application file for complete search history.

(56) References Cited

U.S. PATENT DOCUMENTS

| | | | |
|---|---|---|---|
| 5,506,595 A * | 4/1996 | Fukano et al. | 345/7 |
| 5,621,457 A * | 4/1997 | Ishiwaka et al. | 348/78 |
| 5,729,619 A * | 3/1998 | Puma | 382/115 |
| 6,400,835 B1 * | 6/2002 | Lemelson et al. | 382/118 |
| 6,831,993 B2 * | 12/2004 | Lemelson et al. | 382/118 |
| 7,116,803 B2 * | 10/2006 | Lemelson et al. | 382/118 |
| 7,152,024 B2 * | 12/2006 | Marschner et al. | 703/2 |
| 7,330,124 B2 * | 2/2008 | Ota | 340/576 |

FOREIGN PATENT DOCUMENTS

| | | |
|---|---|---|
| GB | 2434835 | 8/2007 |
| JP | A-H7-313459 | 12/1995 |
| JP | A-2006-248365 | 9/2006 |
| JP | A-2006-263334 | 10/2006 |
| JP | A-2006-293909 | 10/2006 |
| JP | A-2007-003462 | 1/2007 |
| JP | A-2007-4448 | 1/2007 |

(Continued)

OTHER PUBLICATIONS

Ohno,Takehiko, Mukawa, Naoki, Yoshikawa, Atsushi, "An Eyeball Model Based Eye Tracking Method," *Eight Image Sensing Symposium*, pp. 307-312, 2002.

(Continued)

*Primary Examiner* — Andrae S Allison
(74) *Attorney, Agent, or Firm* — Posz Law Group, PLC

(57) ABSTRACT

An apparatus for detecting a gaze direction of a driver is mounted on an automotive vehicle. An image of the driver's face on which infrared rays are incident is reflected on a windshield, and the reflected image is fed into a camera. An outside view entering through the windshield may be subtracted from the image of the driver's face taken into the camera to obtain a clearer image of the driver's face. A gaze direction of the driver is detected by a known method (refer to the Specification) based on the image taken by the camera. A mirror for further reflecting the image reflected on the windshield may be added to the apparatus to position the camera freely in the vehicle. A band-pass filter for allowing only the infrared rays to pass through may be disposed before the camera to suppress an image of outside view entering through the windshield. The gaze direction of the driver is correctly detected without placing the camera in a direct front of the driver.

18 Claims, 6 Drawing Sheets

FOREIGN PATENT DOCUMENTS

| | | |
|---|---|---|
| JP | A-2007-029712 | 2/2007 |
| JP | A-2007-069680 | 3/2007 |
| JP | A-2007-195775 | 8/2007 |
| WO | WO/2007/029088 | 3/2007 |

OTHER PUBLICATIONS

Xiao, Jing, Moriyama, Tsuyoshi, Kanade, Takeo, Cohn, Jeffrey F., "Robust Full-Motion Recovery Head by Dynamic templates and Re-registration Techniques," *Robotics Institute*, International Journal of Imaging Systems and Technology, vol. 13, Sep. 13, 2003, Retrieved from World Wide Web Nov. 20, 2008.

Lucey, Simon et al. "AAM Derived Face Representations for Robust Facial Action Recognition" *Robotics Institute, Carnegie Mellon University*. Proceeding of the $7^{th}$ International Conference on Automatic Face and Gesture Recognition, IEEE 2006.

* cited by examiner

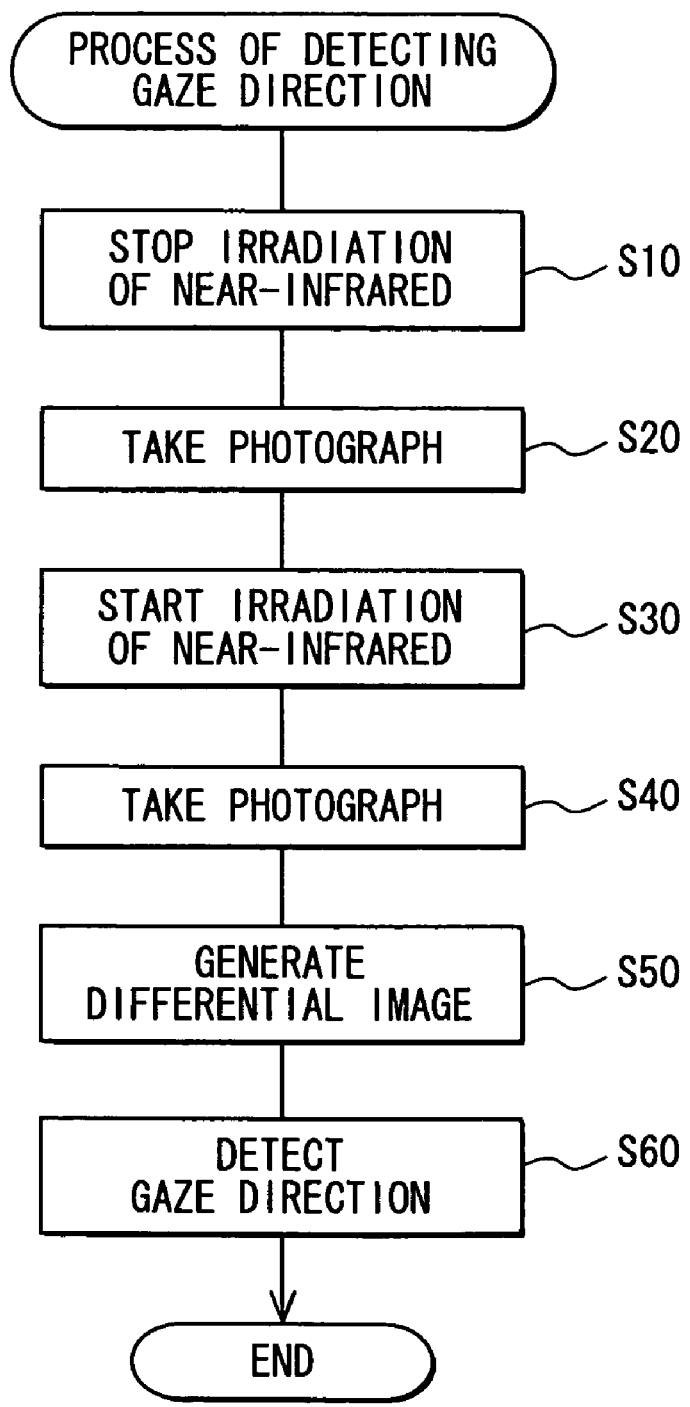

APPARATUS FOR DETECTING FEATURE OF DRIVER'S FACE

CROSS-REFERENCE TO RELATED APPLICATION

This application is based upon and claims benefit of priority of Japanese Patent Application No. 2007-317108 filed on Dec. 7, 2007, the content of which is incorporated herein by reference.

BACKGROUND OF THE INVENTION

1. Field of the Invention

The present invention relates to an apparatus for detecting features of a face of a driver of an automotive vehicle.

2. Description of Related Art

A technology for detecting a feature of a face of a driver of an automotive vehicle has been known hitherto. For example, by detecting a gaze direction of the driver, whether the driver is watching an obstacle in front of the vehicle or not is determined according to the technology. If the driver is not watching the obstacle, a warning can be given to the driver. It is necessary to take a photograph of the driver's face to detect the line of his sight. For this purpose, a camera 101 is positioned underneath a direct front of the driver's face DR11 not to interrupt the sight of the driver, as shown in FIG. 6 attached hereto. Reference is made to JP-A-2006-95008 in this respect. There is a problem, however, in the conventional technology, that the driver's face is not caught by the camera from a direct front of the driver. Moreover, it is difficult to accurately detect features of the face from the photograph.

SUMMARY OF THE INVENTION

The present invention has been made in view of the above-mentioned problem, and an object of the present invention is to provide an improved apparatus for detecting a feature of a driver's face, which is able to take a photograph from a direct front of his face and to accurately detect the feature of his face.

The apparatus for detecting a feature (such as a gaze direction) of a driver's face is mounted on an automotive vehicle. By detecting the gaze direction of the driver, whether the driver is aware of an obstacle in front of the vehicle is determined. If the driver is not aware of the obstacle, a warning can be given to the driver.

The apparatus includes an irradiator for irradiating rays such as near-infrared rays toward the driver's face, a camera for taking a photograph of an image of the driver's face that is reflected on a windshield, and a controller for controlling an entire operation of the apparatus and for detecting the gaze direction of the driver. The image of the driver's face, on which the infrared rays are irradiated, is reflected on a windshield. The image reflected on the windshield is fed to the camera that takes a photograph of the driver's face. An image of outside scenery entering through the windshield may be subtracted from the photographed image of the driver's face. Based on the image of the driver's face, the gaze direction of the driver is detected according to a known method such as that disclosed by T. Ohno et al. (refer to detailed description of the preferred embodiment). The features of the driver's face other than the gaze direction, such as a direction of the face, eye blinks or facial expressions, may be detected.

A mirror for further reflecting the image reflected on the windshield toward the camera may be used to improve flexibility of a layout of the apparatus in the vehicle. A band-pass filter for passing only the infrared rays may be placed between the mirror and the camera to suppress the image of outside scenery entering through the windshield. Distortion of the image reflected on the windshield may be rectified by using a mirror having such a function. The distortion may be compensated by a lens of the camera, by giving such a function to the lens.

According to the present invention, the driver's face is caught by the camera from a direct front of the driver without placing the camera in way of driver's front sight. Furthermore, accuracy in detecting the gaze direction of the driver is improved with a photograph of the camera. Other objects and features of the present invention will become more readily apparent from a better understanding of the preferred embodiment described below with reference to the following drawings.

BRIEF DESCRIPTION OF THE DRAWINGS

FIG. 4 is a flowchart showing a process of detecting a gaze direction of a driver;

DETAILED DESCRIPTION OF THE PREFERRED EMBODIMENT

Figure 1:
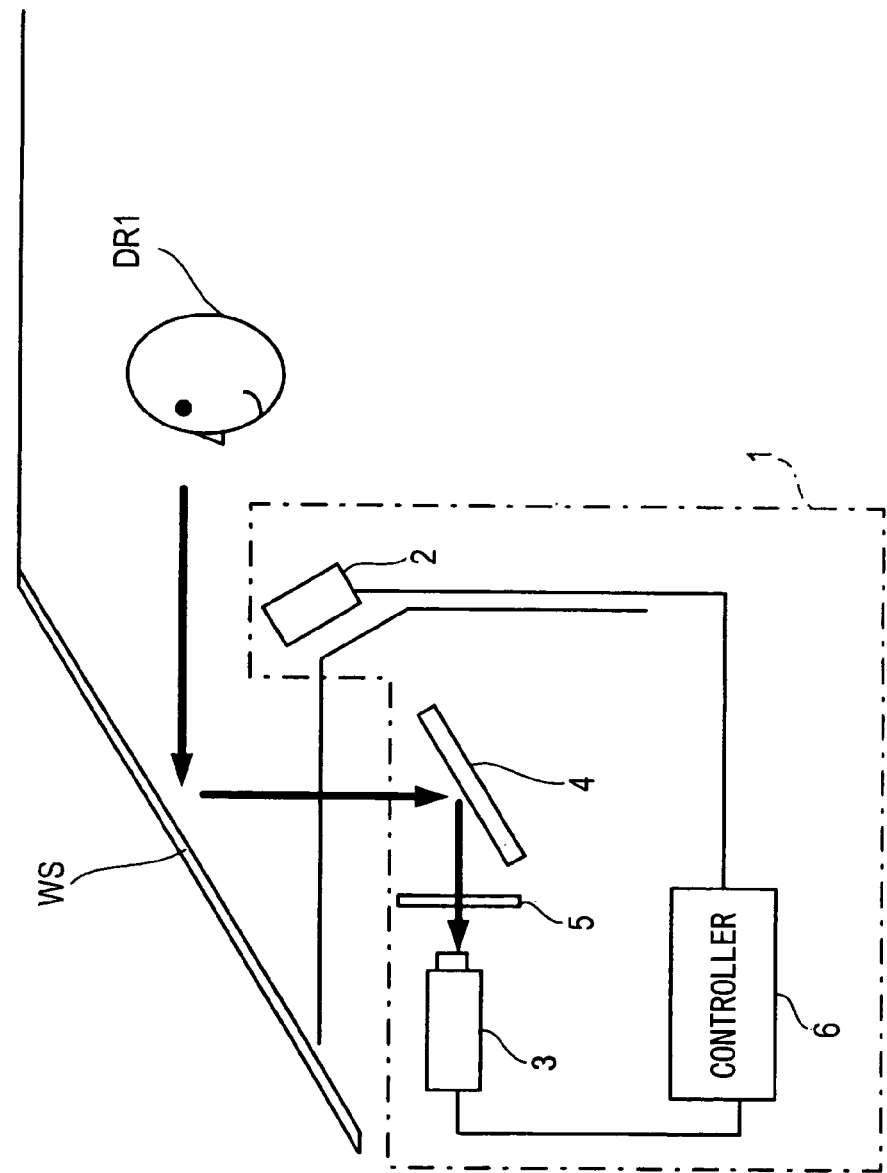
FIG. 1 is a schematic diagram showing an apparatus for detecting a line of sight of a driver according to the present invention.

A preferred embodiment of the present invention will be described with reference to FIGS. 1-5. An apparatus 1 for detecting a gaze direction of a driver DR1 sitting on a driver's seat is mounted on an automotive vehicle. The apparatus 1 includes: an irradiator 2 for irradiating near-infrared rays toward the driver's face; a camera 3 for taking a photograph of the driver's face; a mirror 4 for reflecting an image of the driver's face reflected on a windshield WS; a band-pass filter 5, disposed between the camera 3 and the mirror 4, for passing only light having wavelengths close to those of the near-infrared rays irradiated from the irradiator 2; and controller 6 for controlling an entire apparatus and for detecting the line of sight of the driver DR1.

Figure 2:
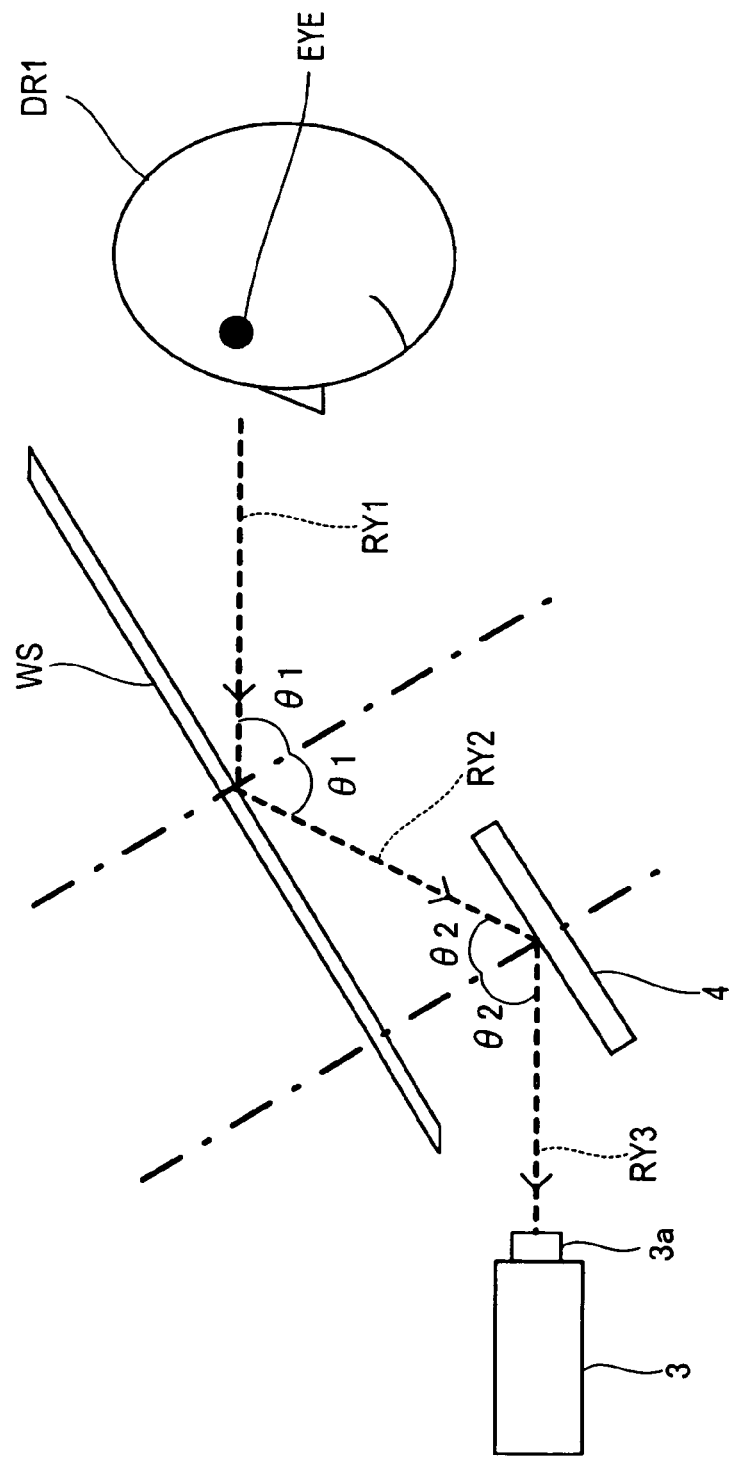
FIG. 2 is a schematic drawing showing a position of a camera in the apparatus.

It is preferable to arrange the camera 3 and other components as shown in FIG. 2 to effectively lead the near-infrared rays reflected on eyes of the driver DR1. The near-infrared rays (RY1) incident upon the eyes of the driver DR1 and reflected thereon are directed toward the windshield WS with an incident angle θ1. The near-infrared rays (RY2) reflected on the windshield WS are incident upon the mirror with an incident angle θ2, and the near-infrared rays (RY3) reflected on the mirror 4 directly enters into a lens 3a of the camera 3. In this arrangement, the indent angles θ1 and θ2 are set to be equal to each other. In other words, the mirror 4 is positioned to be in parallel to the windshield WS.

The windshield WS has radii of curvature different in the vertical direction and the horizontal direction. Therefore, the image of the driver DR1 on the windshield WS includes distortion and astigmatism. To compensate the distortion and astigmatism of the image and to input a corrected image to the camera 3, a mirror that has such a compensating function is used as the mirror 4. More particularly, the radius of curvature Rv of windshield WS in the vertical direction is smaller than the radius of curvature Rh in the horizontal direction. To compensate the difference in the radii of the windshield WS, the mirror 4 is made to have a radius of curvature Rhm in the horizontal direction that is smaller than a radius of curvature Rvm in the vertical direction.

Figure 3:
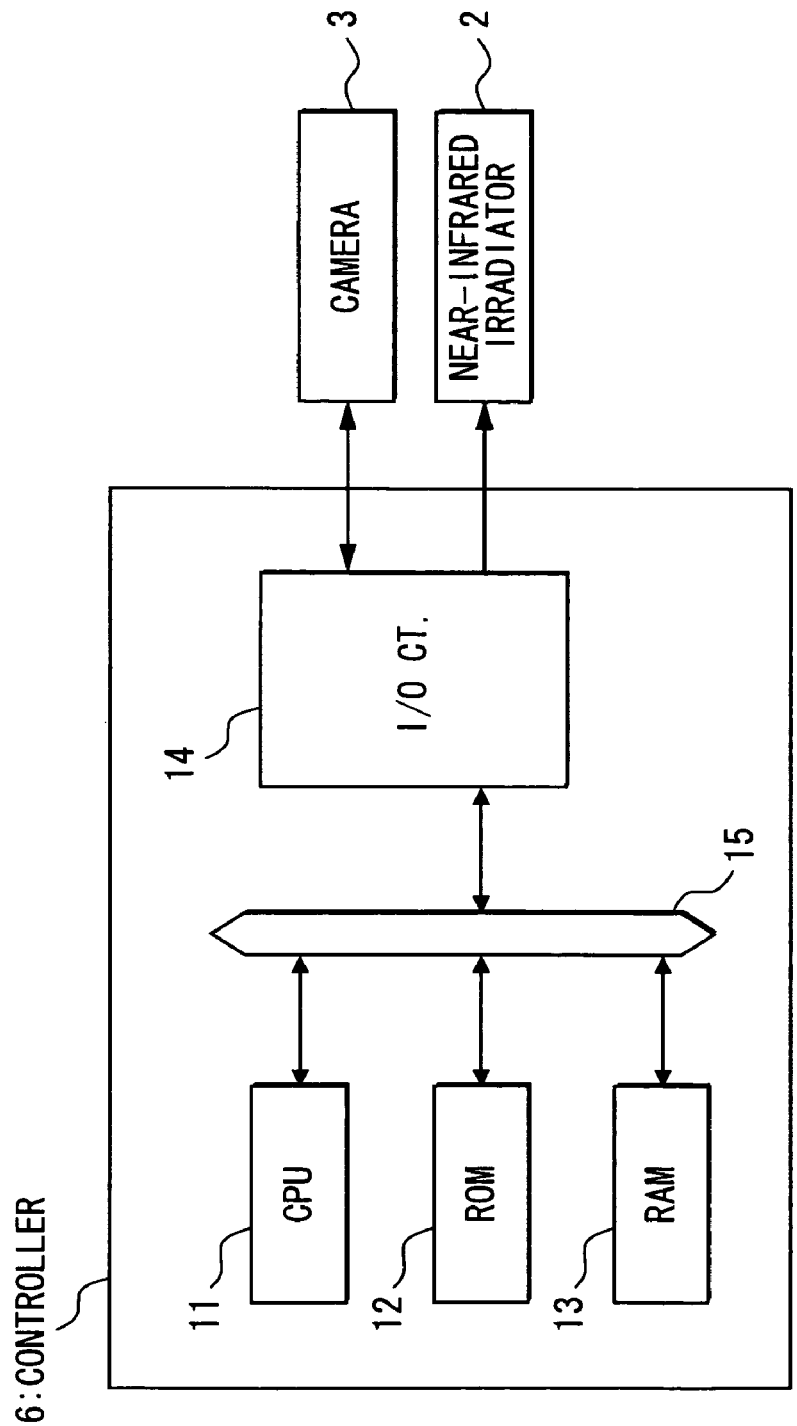
FIG. 3 is a block diagram showing a structure of a controller used in the apparatus shown in FIG. 1.

As shown in FIG. 3, the controller 6 includes a CPU 11, an ROM 12, an RAM 13 and an input/output circuit 14. The input/output circuit 14 communicates with the components of the controller 6 through a bus 15. The near-infrared irradiator 2 is controlled by the controller 6, and the camera 3 is operated under control of the controller 6.

Figure 5A:
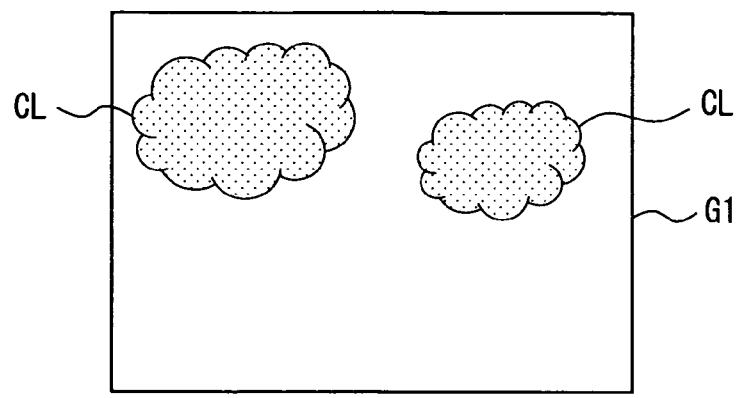
FIGS. 5A, 5B, and 5C show images taken by a camera in the apparatus shown in FIG. 1.

A process of detecting a gaze direction of the driver, which is performed by the CPU 11, will be described with reference to FIG. 4. This process is repeatedly performed during a period in which the controller 6 is in operation. At step S10, irradiation of the near-infrared rays by the irradiator 2 is stopped. Then, at step S20, a photograph is taken by the camera 3. In this photograph, an image G1 of an outside view entering through the windshield WS is obtained as shown in FIG. 5A. In the image G1, there are some clouds CL in the sky are taken.

Figure 5B:
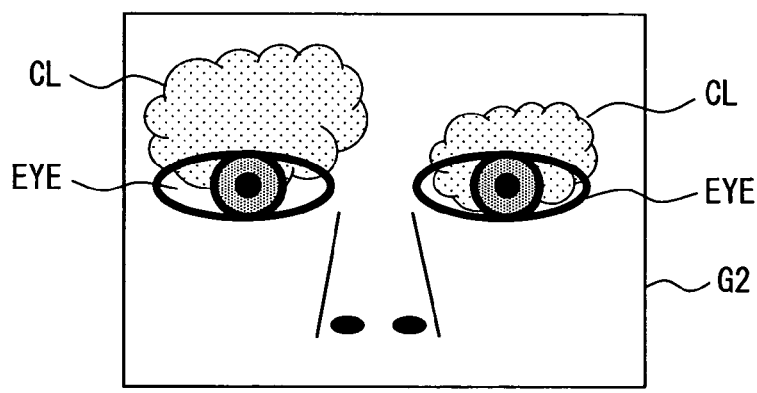
Figure 5C:
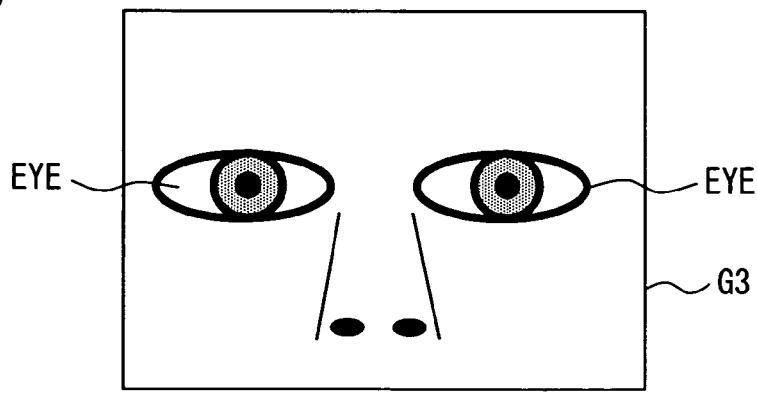
Figure 6:
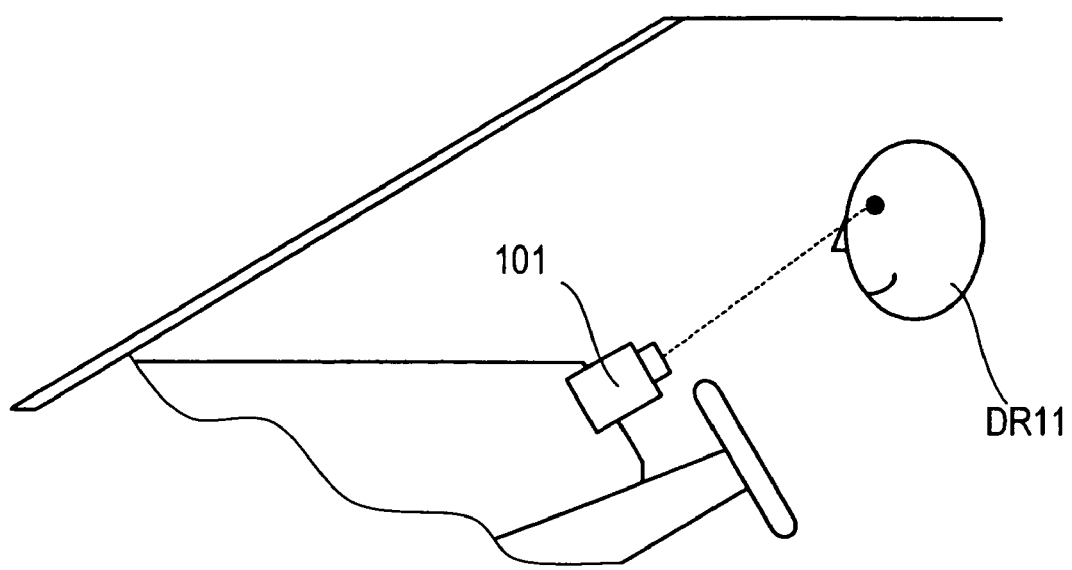
FIG. 6 is a schematic drawing showing a position of a camera in a conventional apparatus for detecting a feature of a driver's face.

At step S30, irradiation of the near-infrared rays on the driver's face is started. Then, at step S40, another photograph is taken by the camera 3. In this photograph, an image G2 shown in FIG. 5B is obtained. The image G2 includes the clouds CL and driver's eyes, both overlapped. At step S50, to extract the driver's face from the image G2, the image G1 is subtracted from the image G2 to thereby obtain an image G3 shown in FIG. 5C. In the image G3, only the eyes and some parts of the driver's face are shown. At step S60, the gaze direction of the driver may be detected, based on the image G3, according to a method disclosed in the following paper. "An Eyeball Model Based Eye Tracking Method" written by Takehiko Ohno, Naoki Mukawa & Atsushi Yoshikawa (pp. 307-312, 2002), presented at the $8^{th}$ Symposium on Image Sensing.

Advantages attained in the foregoing embodiment will be summarized below. The driver's face, on which the near-infrared rays are incident, is reflected on the windshield, and a reflected image is taken into the camera 3. Therefore, the image of the driver's face is taken from its direct front without positioning the camera 3 in front of the driver's face. Accordingly, the front sight of the driver is not hindered by the camera. Thus, the gaze direction of the driver is detected with a high accuracy.

Since the windshield has a concave curvature, the driver's face is enlarged and reflected on the windshield. This enlargement further improves the accuracy in detecting the gaze direction of the driver. Since the driver's image is further reflected on the mirror 4, a position of the camera 3 is not limited to a position directly below the windshield. The position of the camera can be variously selected. Since the mirror 4 compensates the distortion and the astigmatism of the image reflected on the windshield, a correct image can be taken into the camera 3, improving the accuracy in detecting the gaze direction.

The band-pass filter 5 through which only the near-infrared rays are able to pass is used and disposed between the camera 3 and the mirror 4. Therefore, when an outside scenery of the automobile is overlapped on the image of the driver's face, visible lights (other than the near-infrared rays) are eliminated by the band-pass filter 5. Accordingly, the image of the driver's face becomes clearer, and the accuracy in detecting the gaze direction is improved.

The present invention is not limited to the embodiment described above, but it maybe variously modified. For example, Though the gaze direction is detected as a feature of the driver's face, other features such as a direction of the face, eye blinks or an expression may be detected. For detecting the direction of a face, a method disclosed in the following paper may be used, for example. "Robust-Full-Motion Recovery of Head by Dynamic Templates and Re-registration Techniques" written by Jing Xiao, Tsuyoshi Moriyama, Takeo Kanade and Jeffrey F. Cohn, published in International Journal of Imaging Systems and Technology, Vol. 13, September 2003, pp. 85-94. For detecting the eye blinks, a method disclosed in JP-A-7-313459 may be used, for example. For detecting the facial expression, a method disclosed in the following paper may be used, for example. "AAM derived face representations for robust facial action recognition" written by S. Lucey, I. Mattews, C. Hu, Z. Ambadar, F. De la Torre Farade and J. Cohn, Published in Proceedings of the Seventh IEEE International Conference on Automatic Face and Gesture Recognition (FG'06), 2006, pp. 155-160.

Though the mirror 4 is arranged to be in parallel to the windshield WS in the foregoing embodiment, the mirror may be arranged differently as long as the near-infrared rays reflected on the windshield are correctly led to the camera 3. Though the distortion or the astigmatism of the image reflected on the windshield are corrected by the mirror 4 in the foregoing embodiment, those may be corrected by the lens 3a of the camera 3. In this case, a lens 3a having a focal length Fv in the vertical direction which is longer than a focal length Fh in the horizontal direction may be used.

The windshield maybe coated with a film for suppressing the near-infrared rays. An amount of the near-infrared rays entering through the windshield is reduced, and an outside view such as the clouds CL shown in image G2 (FIG. 3B) can be suppressed. Thus, the steps of taking an outside scenery and subtracting the outside scenery from the combined image (e.g., image G2) can be eliminated. It is also possible to coat an inside surface of the windshield with a transparent film for increasing reflection. In this manner, the image of the driver's face becomes clearer, and the accuracy in detecting the gaze direction is improved. Further, a possible double image reflected on the windshield is suppressed by adding the transparent reflection-increasing film. In the case where a process for eliminating the double image is performed in the controller 6, this process can be eliminated.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A method, implemented in part by a controller with a central processing unit, of detecting a feature of a driver's face, the method comprising:
    taking a photograph of an image of a driver's face reflected on a windshield of an automotive vehicle; and
    detecting, by the controller, the feature of the driver's face based on the photograph taken.

2. The method as in claim 1, further comprising:
    reflecting the image of the driver's face reflected on the windshield onto a mirror, the photograph of the image of the driver's face thereby being a photograph of the driver's face reflected on the mirror.

3. A method, implemented in part by a controller with a central processing unit, of detecting a feature of a driver's face, comprising:

taking a photograph of an image of a driver's face reflected on a windshield of an automotive vehicle; and detecting, by the controller, the feature of the driver's face based on the photograph taken, wherein the detecting the feature of the driver's face includes subtracting an outside view entering through the windshield from the photograph of the image of the driver's face.

4. An apparatus for detecting a feature of a driver's face, comprising:

an irradiator for irradiating rays to a face of a driver;

a camera for taking a photograph of the face of the driver; and a controller for detecting a feature of the driver's face based on the photograph of the driver's face; and a mirror, wherein:

an image of the driver's face is reflected on a windshield of an automotive vehicle based on the rays irradiated to the face of the driver, the mirror further reflects the image of the driver's face reflected on the windshield, the camera takes a photograph of the image reflected on the mirror, and the mirror compensates distortion of the image reflected on the windshield to obtain a correct image.

5. The apparatus as in claim 4, wherein the feature of the driver's face is a gaze direction of the driver.

6. The apparatus as in claim 4, wherein the feature of the driver's face is a direction of the driver's face.

7. The apparatus as in claim 4, wherein the feature of the driver's face is blinks of the driver's eyes.

8. The apparatus as in claim 4, wherein the feature of the driver's face is a facial expression of the driver.

9. The apparatus as in claim 4, wherein the rays irradiated by the irradiator are infrared rays.

10. The apparatus as in claim 9 further comprising:

a band-pass filter, disposed between the mirror and the camera, for passing rays having wavelengths close to those of the irradiated infrared rays.

11. The apparatus as in claim 9, wherein the infrared rays are near-infrared rays.

12. The apparatus of claim 4, wherein the mirror is formed to have a radius of curvature in the horizontal direction that is smaller than a radius of curvature in the vertical direction.

13. An apparatus for detecting a feature of a driver's face, comprising:

an irradiator for irradiating rays to a face of a driver;

a camera for taking a photograph of the face of the driver; and a controller for detecting the feature of the driver's face based on the photograph of the driver's face, wherein:

the camera takes the photograph of the driver's face from an image reflected on a windshield of an automotive vehicle, and the camera includes a lens that compensates distortion of the image reflected on the windshield to obtain a correct image.

14. The apparatus as in claim 13, wherein the lens is characterized by a focal length in the vertical direction which is longer than a focal length in the horizontal direction.

15. The apparatus as in claim 13, wherein the feature of the driver's face is a gaze direction of the driver.

16. The apparatus as in claim 13, wherein the feature of the driver's face is a direction of the driver's face.

17. The apparatus as in claim 13, wherein the feature of the driver's face is blinks of the driver's eyes.

18. The apparatus as in claim 13, wherein the feature of the driver's face is a facial expression of the driver.

* * * * *